Jan. 25, 1938.  J. B. HUNTINGTON  2,106,323

DEICING ATTACHMENT FOR AIRCRAFT

Filed Aug. 24, 1937

INVENTOR.
James B. Huntington
BY
*Murray, Sackhoff, Zugelter & Paddack*
ATTORNEYS Patented Jan. 25, 1938

2,106,323

UNITED STATES PATENT OFFICE 2,106,323

DEICING ATTACHMENT FOR AIRCRAFT

James B. Huntington, Cincinnati, Ohio

Application August 24, 1937, Serial No. 160,644

5 Claims. (Cl. 244—134)

The present invention relates to a de-icing attachment for aircraft and particularly to a means for preventing the accumulation of ice upon the forward edge of aircraft wings.

An object of the invention is to provide a simplified means for preventing ice accumulation on aircraft wings.

Another object of the invention is to provide a covering for aircraft wings which may be quickly and economically installed, is light in weight and presents a smooth and water repellent surface when positioned on the aircraft.

A further object of the invention is to provide an attachment for de-icing aircraft wings which comprises a series of layers of cellophane or other suitable material.

Other objects will be apparent from the following specification and drawing, in which.

It is generally known that cellophane is impervious to water, is of light weight, and has great tensile strength in one direction whilst being easily severed in the direction at right angles to the direction of said tensile strength. These properties, and especially the initial one, make cellophane very suitable as a material for my attachment for aircraft wings which generally comprises a number of layers of cellophane sheets formed to cover the forward edge of an aircraft wing where ice usually forms during flights in inclement weather. The cellophane cover is fastened on the wing with its direction of greatest tensile strength disposed transversely of said wing. A wire extending longitudinally of the wing is disposed centrally of the cellophane sheets and beneath each sheet. These wires are anchored to the tip of the wing whilst the free end is actuated or pulled by the aircraft pilot at an angle to the longitudinal direction of the sheet thus severing it in its central portion. Wind friction serves to dislodge said sheet and break it away from the aircraft, the removal of the sheet carrying with it accumulation of ice formed thereon.

Figure 4:
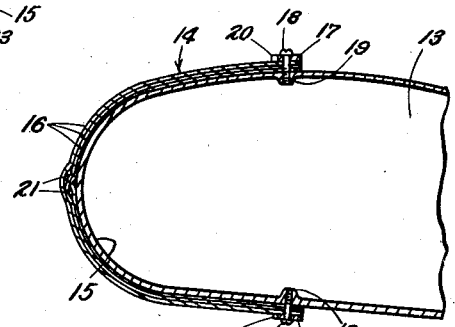
Fig. 4 is an enlarged cross-sectional view taken on line 4—4 of Fig. 3.
Figures 5, 6:
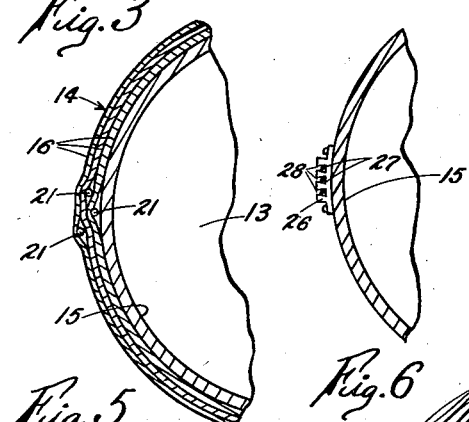
Fig. 5 is an enlarged cross-sectional view taken on line 4—4 of Fig. 3.
Fig. 6 is an elevational view of the wire clamp for my device.

Specifically my invention is attached to an aircraft 8 having a body 9 provided at its forward end with a motor housing 10, an air screw or propeller 11 and a pilot's cockpit 12 located adjacent and rearwardly of said motor housing. The aircraft also carries wings 13 extending from the lower part of the body and rearwardly of the cockpit. My attachment 14 is adapted to be positioned over the portions of the forward edge 15 of the wings which are subjected to the formation of ice during inclement weather and comprises a number of sheets 16 of cellophane fastened about the contour of the forward edge of the wing and extending longitudinally thereof. The sheets also extend transversely of the top and bottom of the wing edge and are fastened to the wing by longitudinal clamping strips 17. My device is shown positioned on an all-metal aircraft so that bolts 18 may be inserted in aligned, annular holes in the clamping strip and longitudinal edges of the cellophane sheets and screwed in chamfered internally threaded holes 19 (Fig. 4) in the wing. In the event my device is used on fabric aircraft, said strips could be pinned or bolted to the transverse ribs of the wings. The leading edge 20 of the clamping strip is serrated for purposes hereinafter set forth. As has been mentioned, the cellophane sheets are positioned on the wing with the direction of greatest tensile strength disposed transversely of said wing.

Figure 2:
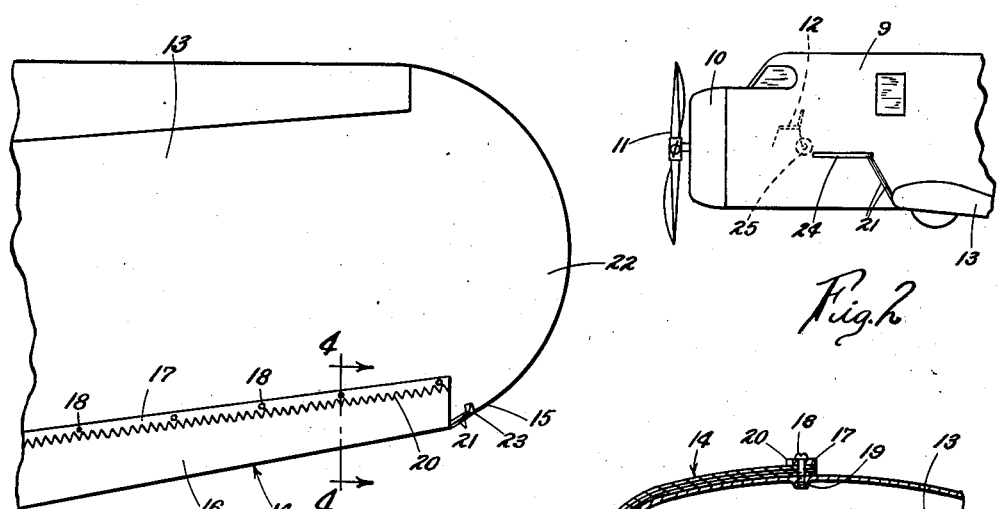
Fig. 2 is a fragmental, side elevational view of the aircraft.
Figure 3:
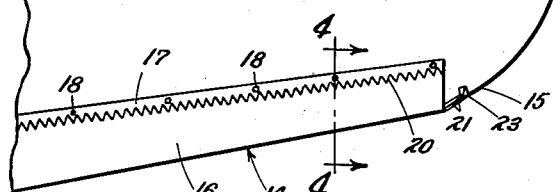
Fig. 3 is an enlarged plan view of the aircraft wing.

A suitable means for severing the cellophane sheets comprises a wire 21 located beneath each sheet and extending longitudinally and centrally thereof. These wires are stranded and annealed and preferably provided with a roughened surface. The wires are anchored to the tip 22 of the wing, beyond the outer transverse edge of the cellophane sheets by a clamping member 23. It is thought that it is better practice to lead the ends of the wires together and insert said leaded end into a pressure clamp actuated by a wing nut. The wires extend from the inner transverse edges of the cellophane sheets and are led through a slot 24 (Fig. 2) formed in the body of the aircraft, and thence to the cockpit 12 to be pulled manually or actuated by crank rotated pulleys 25 or other similar mechanism.

Fastened to the wing intermediate the inner transverse edge of the cellophane sheets and the aircraft body is a wire clamp 26 which has a number of slots 27 having decreased openings 28 adapted to receive the wires upon inward pressure thereon. This wire clamp serves to hold the wires in pre-arranged condition whilst serving to prevent the wires from cutting the cellophane when said wires are inoperative.

Figure 1:
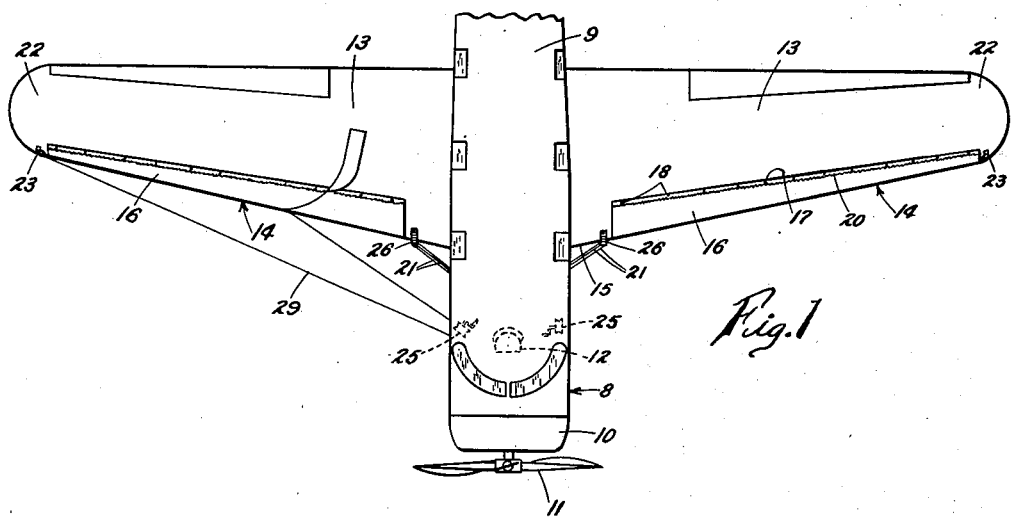
Fig. 1 is a plan view of the forward part of an aircraft having my device positioned thereon.

It will be noted that the wire receiving slot 24 is located forwardly of the wing. When the wire is pulled or actuated by suitable mechanism from the cockpit position, it creates a forward and outward pressure upon the outer adjacent cellophane sheet. This pressure severs the sheet along its entire central longitudinal portion. The used wire 29 (Fig. 1) may then be fastened in any suitable manner and allowed to extend from the cockpit to the anchoring means.

In practice, an aircraft equipped with my attachment would employ a number of cellophane sheets consistent with the length of flight and the weather conditions to be anticipated. During the flight, ice will form upon the exposed outermost sheet of cellophane. When ice accumulation of said sheet reaches a maximum, the pilot of the aircraft pulls or mechanically actuates the wire directly adjacent said sheet. This action severs the sheet longitudinally and centrally thereof, thus exposing the severed portion to high wind velocity. The high wind velocity carries the two halves of the ice-ladened cellophane sheet rearwardly against the serrated edge of the clamping strips, thus cutting the sheet away from the fastening means and allowing it to be removed from the wings. The next subjacent sheet is then in condition to receive the ice formation and the de-icing process is repeated.

It is to be understood that any suitable cellophane severing means can be employed to carry out my invention and further, whilst cellophane is the preferred material for my device, still any sheet material which possesses moisture repellent properties and has suitable tensile strength to withstand wind velocities may be employed as a wing attachment. It is also contemplated that my attachment may also be employed on parts of aircraft body other than the forward edge of the wing to prevent ice accumulation thereon.

What I claim is:

1. A de-icing attachment for aircraft wings comprising a number of sheets of cellophane, clamping strips disposed along the longitudinal edges of the cellophane sheets and having serrated inner edges, means for fastening the clamping strips to the wing, a severing means located beneath each sheet and comprising a relatively thin wire, means for anchoring the wire to the tip of the wing beyond the outer transverse edge of the cellophane sheets, means for detachably holding the wires disposed adjacent the inner transverse edge of the sheets, and means for operating said severing means from the cockpit of the aircraft.

2. A de-icing attachment for aircraft wings comprising a sheet of cellophane, means for clamping the sheet to the wings, a severing means located beneath the sheet and longitudinally thereof and comprising a relatively thin wire, means for anchoring said wire to the tip of the wing, and means located adjacent the inner edge of the wings for operating said severing means.

3. A de-icing attachment for aircraft wings comprising a sheet of cellophane and means for severing the sheet along its longitudinal, central portion.

4. An aircraft having portions of its exterior surface subject to formation of ice thereon, a sheet of cellophane for covering said portions and means for severing said sheet along its longitudinal, central portion.

5. An attachment for the parts of aircraft that are subject to formation of ice comprising a sheet of cellophane for covering said parts, means for fastening the sheet to the parts and means for dislodging said sheet therefrom when ice forms thereon.

JAMES B. HUNTINGTON.